June 27, 1961  R. MUNGEN  2,990,260
GRID DESIGN FOR FLUID BED REACTOR
Filed Dec. 16, 1957  2 Sheets-Sheet 1

INVENTOR.
RICHARD MUNGEN
BY Arthur McIlray
ATTORNEY

June 27, 1961 R. MUNGEN 2,990,260
GRID DESIGN FOR FLUID BED REACTOR
Filed Dec. 16, 1957 2 Sheets-Sheet 2

INVENTOR.
RICHARD MUNGEN
BY
ATTORNEY

United States Patent Office 2,990,260
Patented June 27, 1961

2,990,260
GRID DESIGN FOR FLUID BED REACTOR
Richard Mungen, Tulsa, Okla., assignor to Pan American Petroleum Corporation, Tulsa, Okla., a corporation of Delaware
Filed Dec. 16, 1957, Ser. No. 702,984
7 Claims. (Cl. 23—288)

The present invention relates to a novel grid design for reactors used in handling fluidized beds. More particularly it is concerned with an improved grid design capable of promoting better gas-solids contacting during fluidized operation.

Briefly stated, my invention comprises a grid having upwardly diverging members defining openings or cavities in the grid arranged so as to describe a substantially uniform pattern of cavities, each of which terminates in a passageway through the grid. While the aforesaid members may be varied in shape, it is ordinarily preferred that they be generally conical. A porous structural member is detachably mounted to each of the aforesaid passageways to form a gas-permeable closure for the bottom portion of said cavities. This allows reactant gases to pass upwardly through the grid and prevents solids from flowing downwardly and out of the reactor during a shut-down of operations.

In fluidized operations such as, for example, in the manufacture of hydrocarbons by the reduction of carbon monoxide with hydrogen in the presence of a dense fluidized bed of iron catalyst, a portion of the catalyst has been observed to accumulate on the grid and eventually plug a substantial number of the grid holes. Excessive catalyst deposition occurs in areas of the grid primarily where there is little gas flow, i.e., "dead spots." To avoid this, the gas injection system should be so designed as to produce no stagnant regions of catalyst above the inlet and within the fluidization zone. Conventional fluid units containing grids or other obstructions to gas flow and/or which employ a wide cone angle do not meet these requirements, since catalyst may settle out on the flat upper surfaces of the grid or on the walls of the cone bottom. Catalyst pile-up has been found to be particularly objectionable in exothermic reactions such as hydrocarbon synthesis because accumulation of catalyst not only resulted in inefficient contacting of reactant gases with solids, but also poor heat exchange, consequently causing hot spots in the unfluidized catalyst and ultimately requiring a shut-down of operations. Accumulation of such deposits not only produced serious gas pressure drop but also resulted in deflected gas streams causing erosion of cooling tubes and reactor walls.

Reaction vessels of the type used in the synthesis of hydrocarbons under fluidized conditions, as well as other exothermic reactions requiring a heat transfer surface to absorb heat from the fluidized bed, are quite complex in their internal structure. This complexity of internal structure is primarily due to the large number of cooling tubes required. Since these tubes generally run substantially the full length of the reaction zone, the grid is inaccessible to cleaning and repair work. In order to get to the grid, the tube system must be removed completely from the reactor. With vessels having a diameter of 16 to 18 feet and a height of 40 to 45 feet, the equipment that must be removed is large and cumbersome. Usually, in the case of vessels of this size a period of 6 to 8 weeks is required to remove the tubes, inspect and/or repair the grid and reinstall the tubes and grid.

Accordingly, it is an object of my invention to provide a grid structure requiring a minimum of maintenance and cleaning. It is another object of my invention to provide a grid which can be cleaned and repaired without requiring extensive dismantling of the reactor in which such grid is used. It is still another object of my invention to provide a grid design which will substantially eliminate objectionable plugging of the gas passages through the grid when an appreciable drop in feed gas pressure occurs or when fluidization is temporarily terminated for other reasons.

Figure 1:
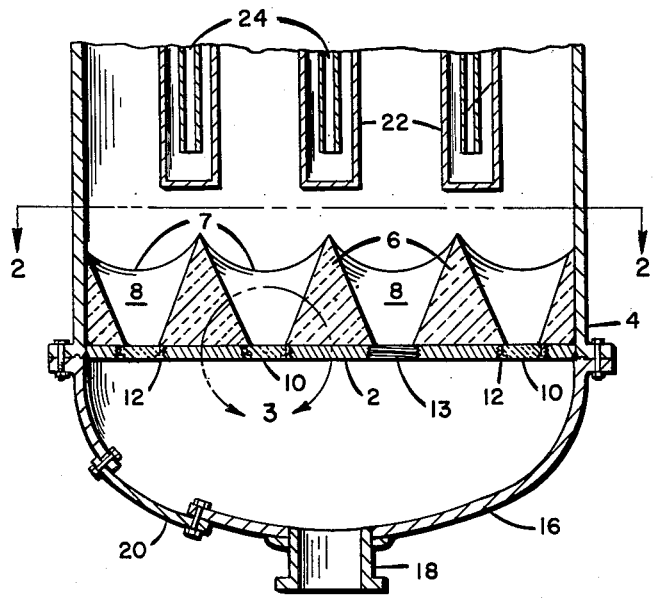
FIGURE 1 is a fragmentary sectional view of my invention.

Referring to FIGURE 1, a grid 2 is welded or otherwise secured to the walls of the reaction vessel 4. On top of grid 2 are hexagonally shaped cones 6. These cones are connected to one another by means of web-like structures 7, and are arranged so as to define frusto-conical cavities 8. Cones 6, if constructed of a suitable refractory material, may be held in place by the use of metal studs running from the metal portion of the grid and embedded in the refractory. The cones also should be placed on a layer of refractory cement spread over the grid metal, thereby forming a firm bond between the cones and the grid. Porous plates 10 are encased around the edges thereof with exteriorly threaded rings 12 which screw into threaded sockets 13. Attached to vessel 4 is a bowl shaped bottom portion 16 having a gas inlet 18 and a man hole 20. The cooling system used in a reactor of this type may include a plurality of thimble or bayonet tubes 22 which extend downwardly through the bed to a level near the top of cones 6. In operation a suitable heat exchange medium passes down through tube 24 and flows upwardly through tube 22 into a manifold system not shown.

The cones may be fabricated out of a number of different materials such as, for example, castable refractory, cast iron, etc. They may be arranged in a variety of ways; however, triangular or square spacing is generally preferred. Also they should preferably be spaced uniformly from about 4 to about 24 inches apart. The size of the porous plates likewise may vary. In the majority of instances, plates from about 3 to about 12 inches in diameter will be found satisfactory. With removable plates in this size range, ready access through the bottom of the reactor may be had for inspection, cleaning or minor repairs of the grid. These plates may be constructed of numerous materials such as, for example, pumice, porous fire clays, glass foam, compact batts of glass wool or fibers, porous metal or ceramic discs, and so forth.

Figure 2:
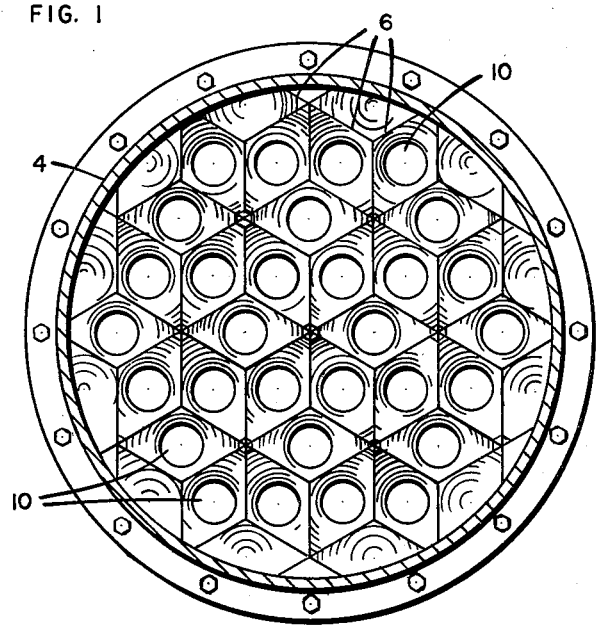
FIGURE 2 is a plan view of FIGURE 1 taken along line 2—2.

In FIGURE 2 it will be seen that no surfaces exist on the grid where excessive amounts of catalyst could possibly accumulate. The steepness of the sides of the cones may vary. However, the cones are preferably slanted at an angle slightly greater than the angle of repose of the catalyst or other solids to be fluidized. Thus, any particles falling on the cone sides slide off and become fluidized again by the gas passing through the porous plates. Generally speaking, the shape of the cones is not critical. For example, instead of being hexagonal they may be tetrahedral or round in shape.

In FIGURE 2 it will be seen that no surfaces exist on in which plate 10 fits into grid 2. With a spanner wrench or similar tool, plate 10 may be loosened from its socket by placing the wrench in holes such as 11 and turning in the desired direction.

Figure 4:
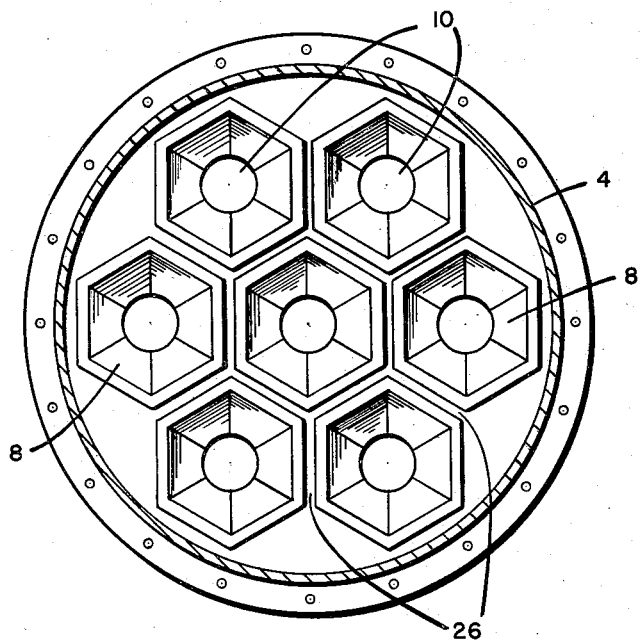
FIGURE 4 is a plan view of a grid employing a slightly different form of my invention from that illustrated in the previous figures.

FIGURE 4 is a modification of the grid illustrated in FIGURES 1 and 2 in which the peaks or cusps have been removed leaving flat separating sections 26 between each frusto-conical cavity 8. Grids of this type are generally considered most effective in fluidized systems in which the fluid bed is composed largely of particles having moderate to low densities.

Fluid bed reactors equipped with my novel grid design may be used in conducting any fluidized process, particularly where improved gas-solids contacting is desired. Inasmuch as the conditions for employing the fluidized technique are now generally well known for a wide variety of processes, it is not considered necessary to go into detail regarding such methods of operation. My invention can be used either in systems in which the fluidized bed is composed of finely divided catalyst capable of promoting a reaction involving one or more vaporous components; or it can be employed in processes in which the particles making up the fluid bed are acted upon either in the presence or in the absence of a solid fluidized catalyst. Examples of the first class of processes are hydrocarbon synthesis, catalytic cracking, etc. The second class of reactions contemplated includes the fluidized reduction of metal oxides such as iron oxide to the free metal, or the roasting of metal sulfides, for example, copper sulfide, to its corresponding oxide prior to electrolytic reduction of the latter to free copper. A further variation of the above processes in which the grid design of my invention is likewise applicable is exemplified in the manufacture of silicones by the fluid bed technique. In this process powdered silicon is fluidized along with finely divided copper catalyst. Methyl chloride or an equivalent alkyl halide is used as the fluidizing gas and reacts with the silicon to form the corresponding alkyl silane.

One of the outstanding features of my invention is the combination of a porous feed gas distributor plate or disc placed in a suitable grid cavity. The shape of this cavity need not necessarily be conical but be substantially any shape which contemplates sides having an angle from the horizontal greater than the angle of repose of the particles being fluidized. By having the porous plates removably mounted to the underside of the grid, it is a simple matter to go in below the grid, repair it or clean it by removing the porous plates, clean the latter or replace them with new plates and reinsert them into the grid. The grid design described and illustrated herein is an extremely practicable one. It favors high gas-solids contacting efficiency and avoids expensive downtime and labor involved with former designs which required complete dismantling of the reactor internals before the grid could be removed for cleaning or repairing.

I claim:

1. A catalytic apparatus comprising in combination a reaction vessel adapted to contain a bed of fluidized solids, a grid in the lower portion of said vessel having upwardly diverging conical members arranged so as to describe a uniformly defined pattern of cavities over the top side of said grid, each of said cavities terminating in a restricted passageway extending through said grid to the opposite side thereof and opening into a chamber located below and attached to said reaction vessel, said chamber being provided with means of access thereto, and a structurally stable porous plug member detachably fitted in each of said passageways on the level of said grid to form a gas-permeable closure for said cavities.

2. The apparatus of claim 1 in which said conical members are hexagonal in shape.

3. The apparatus of claim 1 in which said conical members are round in shape.

4. The apparatus of claim 1 in which said conically shaped members are arranged in a triangular pattern.

5. The apparatus of claim 1 in which said conically shaped members are arranged in a square pattern.

6. The apparatus of claim 1 in which said member is constructed of a porous refractory material.

7. The apparatus of claim 1 in which said member is constructed of porous alumina.

References Cited in the file of this patent

UNITED STATES PATENTS

| | | |
|---|---|---|
| 2,357,901 | Lewis | Sept. 12, 1944 |
| 2,585,274 | Reichl | Feb. 12, 1952 |
| 2,656,258 | Symonds | Oct. 20, 1953 |
| 2,740,752 | Anhorn | Apr. 3, 1956 |
| 2,760,842 | Ward | Aug. 26, 1956 |
| 2,855,273 | Evans | Oct. 7, 1958 |

UNITED STATES PATENT OFFICE
CERTIFICATE OF CORRECTION

Patent No. 2,990,260                      June 27, 1961

Richard Mungen

It is hereby certified that error appears in the above numbered patent requiring correction and that the said Letters Patent should read as corrected below.

Figure 3:
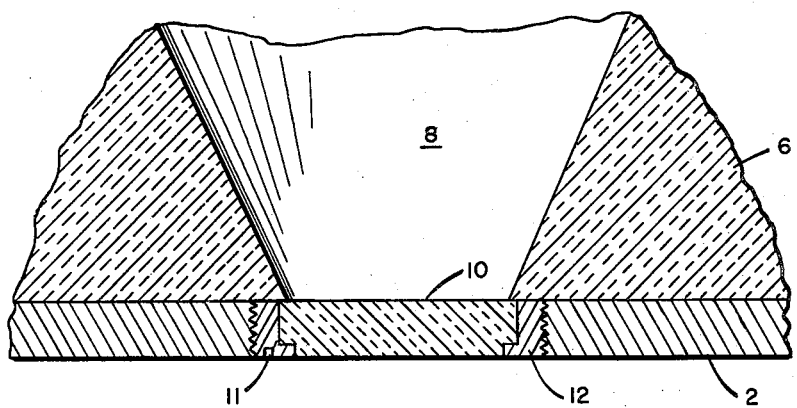
FIGURE 3 is a sectional, fragmentary of that portion of FIGURE 1 designated as 3, illustrating the manner in which the porous plates are affixed to the bases of adjacent cones.

Column 2, line 68, for "In FIGURE 2 it will be seen that no surfaces exist on" read -- In FIGURE 3 a detailed view is shown of the manner --.

Signed and sealed this 9th day of January 1962.

(SEAL)
Attest:

ERNEST W. SWIDER
Attesting Officer

DAVID L. LADD
Commissioner of Patent